(12) United States Patent (10) Patent No.: US 10,762,205 B2
Yuan (45) Date of Patent: Sep. 1, 2020

(54) METHOD AND APPARATUS FOR DISPLAYING KEYBOARD, AND TERMINAL DEVICE

(71) Applicant: Huawei Technologies Co., Ltd., Shenzhen, Guangdong (CN)

(72) Inventor: Zhongju Yuan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 114 days.

(21) Appl. No.: 15/551,266

(22) PCT Filed: Feb. 16, 2015

(86) PCT No.: PCT/CN2015/073200
§ 371 (c)(1),
(2) Date: Aug. 15, 2017

(87) PCT Pub. No.: WO2016/131180
PCT Pub. Date: Aug. 25, 2016

(65) Prior Publication Data
US 2018/0032725 A1 Feb. 1, 2018

(51) Int. Cl.
*G06F 21/55* (2013.01)
*G06F 3/0488* (2013.01)
(Continued)

(52) U.S. Cl.
CPC .......... *G06F 21/556* (2013.01); *G06F 3/0488* (2013.01); *G06F 3/04886* (2013.01);
(Continued)

(58) Field of Classification Search
CPC .............. G06F 3/04886; G06F 3/0236; G06F 3/04883; G06F 3/0416; G06F 3/0484;
(Continued)

(56) References Cited

U.S. PATENT DOCUMENTS

| | | | | |
|---|---|---|---|---|
| 6,851,877 B1* | 2/2005 | Liebhold | ............. | G06F 3/04886 341/22 |
| 7,519,748 B2* | 4/2009 | Kuzmin | ............. | G06F 3/04883 345/173 |

(Continued)

FOREIGN PATENT DOCUMENTS

| | | |
|---|---|---|
| CN | 1431575 A | 7/2003 |
| CN | 1952855 A | 4/2007 |

(Continued)

OTHER PUBLICATIONS

The Word-Gesture Keyboard: Reimagining Keyboard Interaction by Shumin Zhai and Per Ola Kristensson Sep. 2012 | vol. 55 | No. 9 | communications of the acm pp. 11; Sep. (Year: 2012).*

*Primary Examiner* — Jeffrey C Pwu
*Assistant Examiner* — Ali H. Cheema
(74) *Attorney, Agent, or Firm* — Kilpatrick Townsend & Stockton LLP

(57) ABSTRACT

Embodiments of the present invention disclose a method and an apparatus for displaying a keyboard, and a terminal device. The method includes: displaying, on a touchscreen, a keyboard whose keys are normally arranged; before a touching object touches the keyboard on the touchscreen, obtaining a location, which the touching object points to, on the keyboard; adjusting an arrangement order of some keys on the keyboard, where the keys include keys within a preset range, the preset range includes the location, which the touching object points to, on the keyboard, and the preset range includes at least two keys; and displaying the adjusted keyboard on the touchscreen. By means of the technical solutions in the present invention, an arrangement order of some keys on a keyboard displayed by a terminal is adjusted, thereby improving an information input speed, and reducing energy consumption of the terminal.

14 Claims, 7 Drawing Sheets

(51) Int. Cl.
    *G06F 3/02*      (2006.01)
    *G06T 3/40*      (2006.01)
    *G06T 11/60*     (2006.01)
    G06F 3/0484      (2013.01)
    G06F 3/023       (2006.01)

(52) U.S. Cl.
    CPC ............. *G06F 21/552* (2013.01); *G06T 3/40* (2013.01); *G06T 11/60* (2013.01); *G06F 3/0219* (2013.01); *G06F 3/0233* (2013.01); *G06F 3/0236* (2013.01); *G06F 3/0484* (2013.01); *G06F 21/55* (2013.01); *G06F 2203/04805* (2013.01)

(58) Field of Classification Search
    CPC .... G06F 21/556; G06F 21/552; G06F 1/1624; G06F 1/3203; G06F 17/276; G06F 3/0219; G06F 3/0202; G06F 3/0233; G06F 21/55; G06F 3/0488; G06F 3/04; G06F 3/02; G06F 1/1643; G06F 2203/04805; G06T 3/40; G06T 11/60
    USPC ........ 715/780, 773, 745; 345/173, 168, 177; 341/22, 33; 455/566; 178/18.01; 726/23
    See application file for complete search history.

(56) References Cited

U.S. PATENT DOCUMENTS

| | | | |
|---|---|---|---|
| 9,448,724 B2* | 9/2016 | Arnold | G06F 3/04886 |
| 2007/0273560 A1* | 11/2007 | Hua | G06F 3/0202 |
| | | | 341/33 |
| 2009/0122007 A1 | 5/2009 | Tsuzaki et al. | |
| 2009/0194341 A1* | 8/2009 | Nousiainen | G06F 1/3203 |
| | | | 178/18.01 |
| 2009/0244023 A1* | 10/2009 | Kim | G06F 3/0416 |
| | | | 345/173 |
| 2009/0315848 A1* | 12/2009 | Ku | G06F 3/0416 |
| | | | 345/173 |
| 2010/0004029 A1* | 1/2010 | Kim | G06F 1/1643 |
| | | | 455/566 |
| 2010/0073329 A1* | 3/2010 | Raman | G06F 3/0233 |
| | | | 345/177 |
| 2012/0062465 A1 | 3/2012 | Spetalnick | |
| 2012/0268393 A1 | 10/2012 | Lee | |
| 2012/0326984 A1* | 12/2012 | Ghassabian | G06F 3/0236 |
| | | | 345/168 |
| 2013/0283195 A1 | 10/2013 | Bilgen et al. | |
| 2014/0082514 A1* | 3/2014 | Sivaraman | G06F 3/0219 |
| | | | 715/745 |
| 2014/0380228 A1* | 12/2014 | Shu | G06F 3/0484 |
| | | | 715/780 |
| 2015/0040055 A1* | 2/2015 | Zhao | G06F 3/04886 |
| | | | 715/773 |
| 2015/0067571 A1* | 3/2015 | Marsden | G06F 17/276 |
| | | | 715/773 |
| 2015/0172430 A1* | 6/2015 | Sin | H04M 1/0281 |
| | | | 455/566 |
| 2015/0293695 A1* | 10/2015 | Schonleben | G06F 3/04886 |
| | | | 345/173 |
| 2015/0309724 A1 | 10/2015 | Wu | |
| 2016/0077734 A1* | 3/2016 | Buxton | G06F 3/0488 |
| | | | 715/773 |
| 2016/0274788 A1* | 9/2016 | Li | G06F 3/044 |

FOREIGN PATENT DOCUMENTS

| | | |
|---|---|---|
| CN | 102968602 A | 3/2013 |
| CN | 102981772 A | 3/2013 |
| CN | 103959206 A | 7/2014 |

* cited by examiner

METHOD AND APPARATUS FOR DISPLAYING KEYBOARD, AND TERMINAL DEVICE

CROSS REFERENCE TO RELATED APPLICATIONS

The present application claims priority under 35 U.S.C. § 365 to International Patent Application No. PCT/CN2015/073200 filed Feb. 16, 2015, which is incorporated herein by reference into the present disclosure as if fully set forth herein.

TECHNICAL FIELD

Embodiments of the present invention relate to the field of electronic product application, and in particular, to a method and an apparatus for displaying a keyboard, and a terminal device.

BACKGROUND

With development of science and technology, touchscreens start to be used on many electronic products such as a mobile phone and a tablet computer. An electronic product may have an independent operating system. A user may autonomously install, according to a need, application software provided by a third-party service provider. By using such a type of application software, functions of an electronic product may be extended.

Currently, an electronic product generally has a network connection function. A user can browse various types of information on a network and download and install various types of application software by using an electronic product. When using network resources, an electronic product may face various network attacks. When a network attack is launched on information input of an electronic product, key information is leaked. Specifically, when logging into various clients (for example, a bank client) or performing user registration or login on various related web pages (for example, an email box) by using an electronic product, a user needs to input key information such as a user name or a password on a screen presented by the electronic product. In this case, if the electronic product already suffers a network attack, an attacker can determine a keyboard layout by obtaining an input method used by the electronic product; and determine, by obtaining a touch point that is touched by the user on the screen presented by the electronic product and with reference to the keyboard layout, a character input by the user when the user touches the screen of the electronic product each time. Based on a character corresponding to each obtained touch point, the attacker can determine the key information input by the user.

It can be learned that, a current keyboard display manner of an electronic product easily causes leakage of key information.

SUMMARY

Embodiments of the present invention provide a method and an apparatus for displaying a keyboard, and a terminal device, to resolve a leakage problem of key information that is caused by a current keyboard display manner of an electronic product.

Specific technical solutions provided by the embodiments of the present invention are as follows:

According to a first aspect, a method for displaying a keyboard is provided, including: displaying, on a touchscreen, a keyboard whose keys are normally arranged; before a touching object touches the keyboard on the touchscreen, obtaining a location, which the touching object points to, on the keyboard; adjusting an arrangement order of some keys on the keyboard, where the keys include keys within a preset range, the preset range includes the location, which the touching object points to, on the keyboard, and the preset range includes at least two keys; and displaying the adjusted keyboard on the touchscreen.

With reference to the first aspect, in a first possible implementation manner, before the obtaining a location, which the touching object points to, on the keyboard, it is determined that to-be-input information is key information.

With reference to the first possible implementation manner of the first aspect, in a second possible implementation manner, an attribute information type of an input box that is currently presented for information input is obtained, and when the attribute information type of the input box is a key information type, it is determined that the to-be-input information is key information; or a keyword included in information that is already input to an input box that is currently presented for information input is obtained, and when a preset keyword set includes the obtained keyword, it is determined that the to-be-input information is key information.

With reference to the first aspect, or the first possible implementation manner or the second possible implementation manner of the first aspect, in a third possible implementation manner, before the adjusting an arrangement order of some keys on the keyboard, a distance between the touching object and the touchscreen is obtained; and it is determined that the obtained distance is less than or equal to a first preset threshold.

With reference to the third possible implementation manner of the first aspect, in a fourth possible implementation manner, the arrangement order of the keys on the keyboard is randomly adjusted; or the arrangement order of the keys on the keyboard is adjusted according to a movement track of the touching object on the keyboard.

With reference to any one of the first aspect or the first to the fourth possible implementation manners of the first aspect, in a fifth possible implementation manner, the keys whose arrangement order is adjusted are scaled up according to a preset percentage and the keys that are scaled up are displayed in a preset manner; or all keys on the keyboard are displayed, where all the keys include the keys whose arrangement order is adjusted and a key whose arrangement order is not adjusted.

With reference to the fifth possible implementation manner of the first aspect, in a sixth possible implementation manner, the keys whose arrangement order is adjusted are displayed in a rectangle, where the rectangle is divided into N parts, and each part, which is obtained by means of dividing, of the rectangle corresponds to a key whose arrangement order is adjusted; or the keys whose order is adjusted are displayed in a circle, where the circle loop is divided into N parts, and each part, which is obtained by means of dividing, of the circle corresponds to a key whose arrangement order is adjusted; or the keys whose order is adjusted are displayed in a loop, where the loop is divided into N parts, and each part, which is obtained by means of dividing, of the loop corresponds to a key whose arrangement order is adjusted; and N is equal to a quantity of the keys whose arrangement order is adjusted.

With reference to any one of the first aspect or the first to the sixth possible implementation manners of the first aspect, in a seventh possible implementation manner, when it is detected that the distance between the touching object and the touchscreen is greater than a second preset threshold, the order of the keys is restored to a normal arrangement order; or when it is detected that the location, which the touching object points to, on the keyboard is out of the preset range, the order of the keys is restored to a normal arrangement order.

According to a second aspect, an apparatus for displaying a keyboard is provided, including: a display unit, configured to display, on a touchscreen, a keyboard whose keys are normally arranged; a location obtaining unit, configured to: before a touching object touches the keyboard on the touchscreen, obtain a location, which the touching object points to, on the keyboard; and an adjustment unit, configured to adjust an arrangement order of some keys on the keyboard displayed by the display unit, where the keys include keys within a preset range, the preset range includes the location, which the touching object points to and which is obtained by the location obtaining unit, on the keyboard, and the preset range includes at least two keys, where the display unit is further configured to display, on the touchscreen, the keyboard adjusted by the adjustment unit.

With reference to the second aspect, in a first possible implementation manner, the apparatus for displaying a keyboard further includes a first determining unit, where the first determining unit is configured to: before the location obtaining unit obtains the location, which the touching object points to, on the keyboard, determine that to-be-input information is key information.

With reference to the first possible implementation manner of the second aspect, in a second possible implementation manner, the first determining unit is specifically configured to: before the location obtaining unit obtains the location, which the touching object points to, on the keyboard, obtain an attribute information type of an input box that is currently presented for information input, and when the attribute information type of the input box is a key information type, determine that the to-be-input information is key information; or before the location obtaining unit obtains the location, which the touching object points to, on the keyboard, obtain a keyword included in information that is already input to an input box that is currently presented for information input, and when a preset keyword set includes the obtained keyword, determine that the to-be-input information is key information.

With reference to the second aspect, or the first possible implementation manner or the second possible implementation manner of the second aspect, in a third possible implementation manner, the apparatus for displaying a keyboard further includes a second determining unit, where the second determining unit is configured to: before the adjustment unit adjusts the arrangement order of the keys on the keyboard, obtain a distance between the touching object and the touchscreen; and determine that the obtained distance is less than or equal to a first preset threshold.

With reference to the third possible implementation manner of the second aspect, in a fourth possible implementation manner, the adjustment unit is specifically configured to: randomly adjust the arrangement order of the keys on the keyboard; or adjust the arrangement order of the keys on the keyboard according to a movement track of the touching object on the keyboard.

With reference to any one of the second aspect or the first to the fourth possible implementation manners of the second aspect, in a fifth possible implementation manner, when displaying the adjusted keyboard on the touchscreen, the display unit is specifically configured to: scale up, according to a preset percentage, the keys whose arrangement order is adjusted, and display, in a preset manner, the keys that are scaled up; or display all keys on the keyboard, where all the keys include the keys whose arrangement order is adjusted and a key whose arrangement order is not adjusted.

With reference to the fifth possible implementation manner of the second aspect, in a sixth possible implementation manner, when displaying, in the preset manner, the keys that are scaled up, the display unit is specifically configured to: display, in a rectangle, the keys whose arrangement order is adjusted, where the rectangle is divided into N parts, and each part, which is obtained by means of dividing, of the rectangle corresponds to a key whose arrangement order is adjusted; or display, in a circle, the keys whose order is adjusted, where the circle loop is divided into N parts, and each part, which is obtained by means of dividing, of the circle corresponds to a key whose arrangement order is adjusted; or display, in a loop, the keys whose order is adjusted, where the loop is divided into N parts, and each part, which is obtained by means of dividing, of the loop corresponds to a key whose arrangement order is adjusted; and N is equal to a quantity of the keys whose arrangement order is adjusted.

With reference to any one of the second aspect or the first to the sixth possible implementation manners of the second aspect, in a seventh possible implementation manner, the adjustment unit is further configured to: after the display unit displays the adjusted keyboard on the touchscreen, when it is detected that the distance between the touching object and the touchscreen is greater than a second preset threshold, restore the order of the keys to a normal arrangement order; or after the display unit displays the adjusted keyboard on the touchscreen, when it is detected that the location, which the touching object points to, on the keyboard is out of the preset range, restore the order of the keys to a normal arrangement order.

According to a third aspect, a terminal device is provided, including: a memory, configured to store a software program and a module; a display unit, configured to display, on a touchscreen, a keyboard whose keys are normally arranged; a detection apparatus, configured to identify a touching object, and before the touching object touches the keyboard on the touchscreen, obtain a key location, which the touching object points to, on the keyboard displayed by the display unit; and a processor, configured to run the software program and the module stored in the memory, to perform the following operation: adjusting an arrangement order of some keys on the keyboard displayed by the display unit, where the keys include keys within a preset range, the preset range includes the location, which the touching object points to and which is obtained by the sensor, on the keyboard, and the preset range includes at least two keys, where the display unit is further configured to display, on the touchscreen, the keyboard adjusted by the processor.

With reference to the third aspect, in a first possible implementation manner, the processor is further configured to: before the location, which the touching object points to, on the keyboard is obtained, determine that to-be-input information is key information.

With reference to the first possible implementation manner of the third aspect, in a second possible implementation manner, when determining that the to-be-input information is key information, the processor is specifically configured to: obtain an attribute information type of an input box that is currently presented for information input, and when the attribute information type of the input box is a key information type, determine that the to-be-input information is key information; or obtain a keyword included in information that is already input to an input box that is currently presented for information input, and when a preset keyword set includes the obtained keyword, determine that the to-be-input information is key information.

With reference to the third aspect, or the first possible implementation manner or the second possible implementation manner of the third aspect, in a third possible implementation manner, the detection unit is further configured to: before the arrangement order of the keys on the keyboard is adjusted, obtain a distance between the touching object and the touchscreen; and the processor is further configured to determine that the distance obtained by the detection unit is less than or equal to a first preset threshold.

With reference to the third possible implementation manner of the third aspect, in a fourth possible implementation manner, when adjusting the arrangement order of the keys on the keyboard, the processor is specifically configured to: randomly adjust the arrangement order of the keys on the keyboard; or adjust the arrangement order of the keys on the keyboard according to a movement track of the touching object on the keyboard.

With reference to any one of the third aspect or the first to the fourth possible implementation manners of the third aspect, in a fifth possible implementation manner, when displaying the adjusted keyboard on the touchscreen, the display unit is specifically configured to: scale up, according to a preset percentage, the keys whose arrangement order is adjusted, and display, in a preset manner, the keys that are scaled up; or display all keys on the keyboard, where all the keys include the keys whose arrangement order is adjusted and a key whose arrangement order is not adjusted.

With reference to the fifth possible implementation manner of the third aspect, in a sixth possible implementation manner, when displaying, in the preset manner, the keys that are scaled up, the display unit is specifically configured to: display, in a rectangle, the keys whose arrangement order is adjusted, where the rectangle is divided into N parts, and each part, which is obtained by means of dividing, of the rectangle corresponds to a key whose arrangement order is adjusted; or display, in a circle, the keys whose order is adjusted, where the circle loop is divided into N parts, and each part, which is obtained by means of dividing, of the circle corresponds to a key whose arrangement order is adjusted; or display, in a loop, the keys whose order is adjusted, where the loop is divided into N parts, and each part, which is obtained by means of dividing, of the loop corresponds to a key whose arrangement order is adjusted; and N is equal to a quantity of the keys whose arrangement order is adjusted.

With reference to any one of the third aspect or the first to the sixth possible implementation manners of the third aspect, in a seventh possible implementation manner, the processor is further configured to: after the adjusted keyboard is displayed on the touchscreen, when it is detected that the distance between the touching object and the touchscreen is greater than a second preset threshold, restore the order of the keys to a normal arrangement order; or after the adjusted keyboard is displayed on the touchscreen, when it is detected that the location, which the touching object points to, on the keyboard is out of the preset range, restore the order of the keys to a normal arrangement order.

In the embodiments of the present invention, a terminal displays, on a touchscreen, a keyboard that is normally arranged, and before a touching object touches the touchscreen, the terminal obtains a location, which the touching object points to, on the keyboard. The terminal adjusts an arrangement order of some keys on the keyboard, where the keys include keys within a preset range, and the preset range includes the location, which the touching object points to, on the keyboard. By means of the technical solutions in the embodiments of the present invention, before a touching object touches a touchscreen, an arrangement order of some keys on a keyboard displayed by a terminal is adjusted, so that a character obtained by an attacker by using a location of a touch point of a user on a screen of the terminal is different from a character that is actually input by the user, thereby avoiding leakage of key information and ensuring security of the key information. In addition, an arrangement order of only some keys instead of all keys on the keyboard displayed by the terminal is adjusted, thereby avoiding a problem of difficulty in determining a location of a key after an arrangement order of all the keys is adjusted and improving an information input speed. Moreover, because an arrangement order of only some keys on the keyboard displayed by the terminal is adjusted, the terminal can process less information when adjusting the keyboard, the terminal can adjust an arrangement order of the keyboard more quickly, and energy consumption of the terminal can be reduced.

DETAILED DESCRIPTION

To resolve a leakage problem of key information that is caused by a current keyboard display manner of an electronic product, in embodiments of the present invention, before a touching object touches a touchscreen, an arrangement order of some keys on a keyboard displayed by a terminal is adjusted, so that a character obtained by an attacker by using a location of a touch point of a user on a screen of the terminal is different from a character that is actually input by the user, thereby avoiding leakage of key information and ensuring security of the key information. In addition, an arrangement order of only some keys instead of all keys on the keyboard displayed by the terminal is adjusted, thereby avoiding a problem of difficulty in determining a location of a key after an arrangement order of all the keys is adjusted and improving an information input speed. Moreover, because an arrangement order of only some keys on the keyboard displayed by the terminal is adjusted, the terminal can process less information when adjusting the keyboard, the terminal can adjust an arrangement order of the keyboard more quickly, and energy consumption of the terminal can be reduced.

The following further describes the embodiments of the present invention in detail with reference to accompanying drawings in this specification.

Figures 1, 2A:
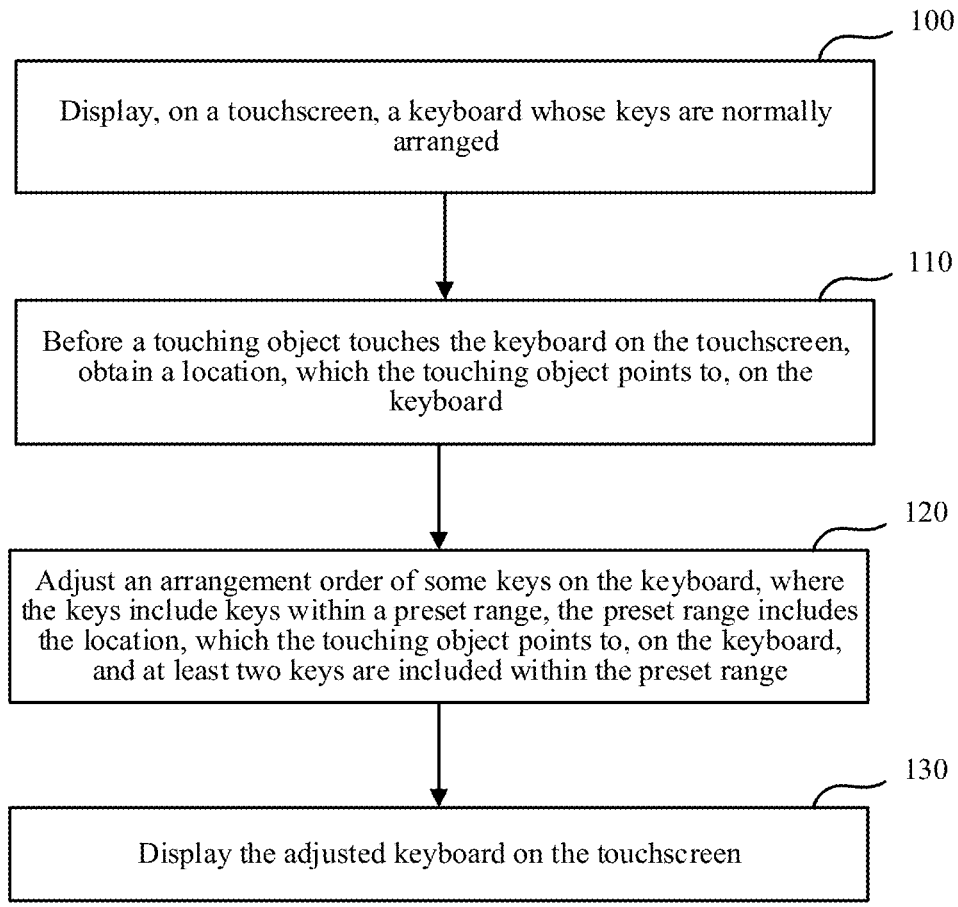
FIG. 1 is a flowchart of a method for displaying a keyboard according to an embodiment of the present invention.
FIG. 2a is a schematic diagram 1 of a displayed keyboard according to an embodiment of the present invention.

Referring to FIG. 1, in an embodiment of the present invention, a method for displaying a keyboard on a touchscreen by a terminal includes the following steps.

Step 100: Display, on a touchscreen, a keyboard whose keys are normally arranged.

In this embodiment of the present invention, a user may perform a corresponding operation on a screen presented by a terminal. The screen presented by the terminal may be a client login or registration screen, for example, a login screen of a chat tool. Alternatively, the screen presented by the terminal may be a web page-version user login or registration screen, for example, a web page-version mailbox login screen. Alternatively, the screen presented by the terminal may be an information input screen (for example, a short message service message input screen or an information input screen of a chat tool) of any application program that runs locally or an information input screen (for example, an information input screen presented when an email is composed by using a web page-version mailbox) on a web page. The corresponding operation performed by the user on the terminal corresponds to the screen presented by the terminal. When the screen presented by the terminal is the login or registration screen, the corresponding operation performed by the user on the terminal is an operation of inputting a user name and a password. When the screen presented by the terminal is the information input screen, the corresponding operation performed by the user on the terminal is an operation of inputting information. The terminal may be an electronic product such as a smartphone or an iPad having a touch control function.

When the terminal detects that the user needs to locally perform the input operation, if a keyboard in the terminal is not in a working state, the keyboard is started, and the keyboard whose keys are normally arranged is displayed in the terminal; or if a keyboard in the terminal is already in a working state, the terminal locally displays the keyboard whose keys are normally arranged.

Step 110: Before a touching object touches the keyboard on the touchscreen, obtain a location, which the touching object points to, on the keyboard.

In this embodiment of the present invention, before a touching object touches the keyboard on a touchscreen, a location, which the touching object points to, on the keyboard is obtained. The touching object is an object such as a stylus or a finger that touches the touchscreen and that can be identified by the touchscreen.

Optionally, before step 110, that is, before the touching object touches the keyboard on the touchscreen, the method may further include: determining, by the terminal, whether to-be-input information is key information; and when the terminal determines that the to-be-input information is key information, obtaining the location, which the touching object points to, on the keyboard; or when the terminal determines that the to-be-input information is not key information, still displaying, by the terminal, the keyboard whose keys are normally arranged.

Optionally, according to different screens presented by the terminal, the terminal may determine whether the to-be-input information is key information in different manners. Specifically, when the screen presented by the terminal is a client login screen or a web page-version user login screen, a method for determining that the to-be-input information is key information specifically includes: obtaining an attribute information type of an input box corresponding to the to-be-input information; and when the attribute information type of the input box is a key information type, determining that the to-be-input information is key information. For example, referring to FIG. 2*a*, on a web page-version mailbox login screen, the to-be-input information is a user name and a password. An attribute information type of an input box corresponding to the user name is a user name attribute information type. An attribute information type of an input box corresponding to the password is a password attribute information type. Both the user name attribute information type and the password attribute information type may be key information types (or only the password attribute information type is the key information type). Therefore, the terminal determines that a to-be-input user name and password (or a to-be-input password) are key information. Further, in the application scenario, the keyboard is not in a working state, and therefore, when the terminal determines that the user needs to input the to-be-input information, the keyboard needs to be started, that is, the keyboard is enabled to be in a working state.

Figure 2B:
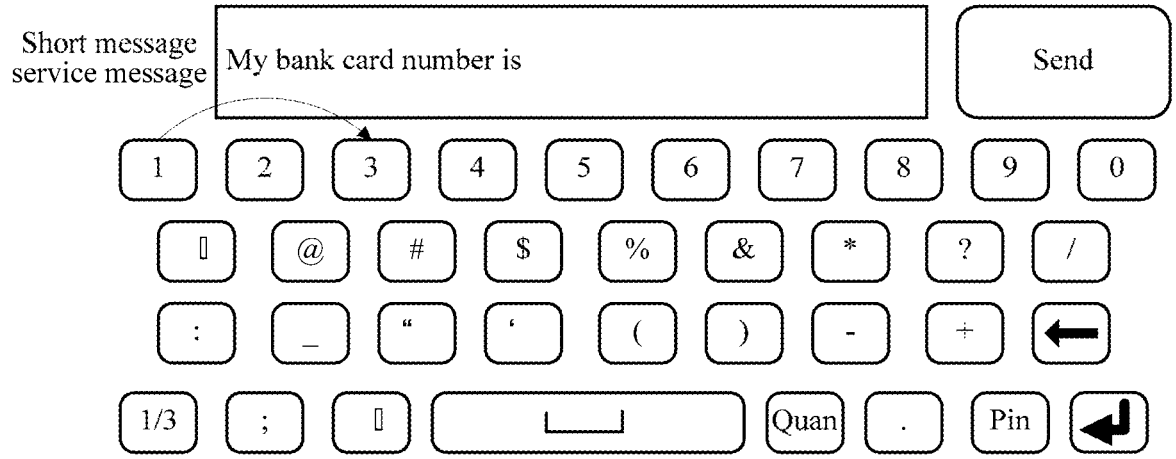
FIG. 2b is a schematic diagram 2 of a displayed keyboard according to an embodiment of the present invention.

Optionally, when the screen presented by the terminal is an information input screen of any application program that runs locally or an information input screen on a web page, a method for determining, by the terminal, that the to-be-input information is key information specifically includes: obtaining a keyword included in latest information that is input by the user to the input box; and when a preset keyword set includes the keyword, determining that the to-be-input information is key information. The preset keyword set includes a preset keyword of the key information. For example, the preset keyword set is {card number, password, ... }. Referring to FIG. 2*b*, on a short message service message input screen, when a user inputs "my password is", a terminal extracts a keyword "password" from the latest information that is input, and the preset keyword set includes the extracted keyword "password". Therefore, the terminal determines that to-be-input information is key information.

Further, in the foregoing application scenario, because the user is inputting information by using the terminal, and a keyboard in the terminal is already in a working state at this moment, the keyboard may maintain the working state.

Step 120: Adjust an arrangement order of some keys on the keyboard, where the keys include keys within a preset range, the preset range includes the location, which the touching object points to, on the keyboard, and the preset range includes at least two keys.

In this embodiment of the present invention, the terminal adjusts an order of keys within the preset range according to the obtained location, which the touching object points to, on the touchscreen and the preset range surrounding the location. The preset range may be preset according to a specific application scenario, and the preset range includes at least two keys. All keys within the preset range may center on the location, which the touching object points to, on the keyboard. Alternatively, all keys within the preset range may not center on the location, which the touching object points to, on the keyboard, and the preset range includes the location, which the touching object points to, on the keyboard.

Optionally, before step 120, that is, before the terminal adjusts an arrangement order of some keys on the keyboard, the method may further include: detecting a distance between the touching object and the touchscreen of the terminal, and determining whether the detected distance between the touching object and the touchscreen of the terminal is less than or equal to a first preset threshold; and when the distance between the touching object and the touchscreen of the terminal is less than or equal to the first preset threshold, adjusting the arrangement order of the keys on the keyboard presented on the touchscreen of the terminal; or when the distance between the touching object and the touchscreen of the terminal is greater than the first preset threshold, remaining, by the terminal, the keyboard whose keys are normally arranged.

Optionally, when the keyboard is in a working state, the terminal detects the distance between the touching object and the touchscreen of the terminal. When the distance between the touching object and the touchscreen of the terminal is less than or equal to the first preset threshold, the method may further include: collecting, by the terminal, statistics on duration from a start time, from which the distance between the touching object and the touchscreen of the terminal is less than or equal to the first preset threshold, to a current time, and when the duration obtained by means of statistics collection is greater than or equal to a preset time threshold, adjusting the arrangement order of the keys on the keyboard displayed on the touchscreen of the terminal. The first preset threshold may be preset according to a specific application scenario. The preset time threshold may also be preset according to a specific application scenario.

Figure 2C:
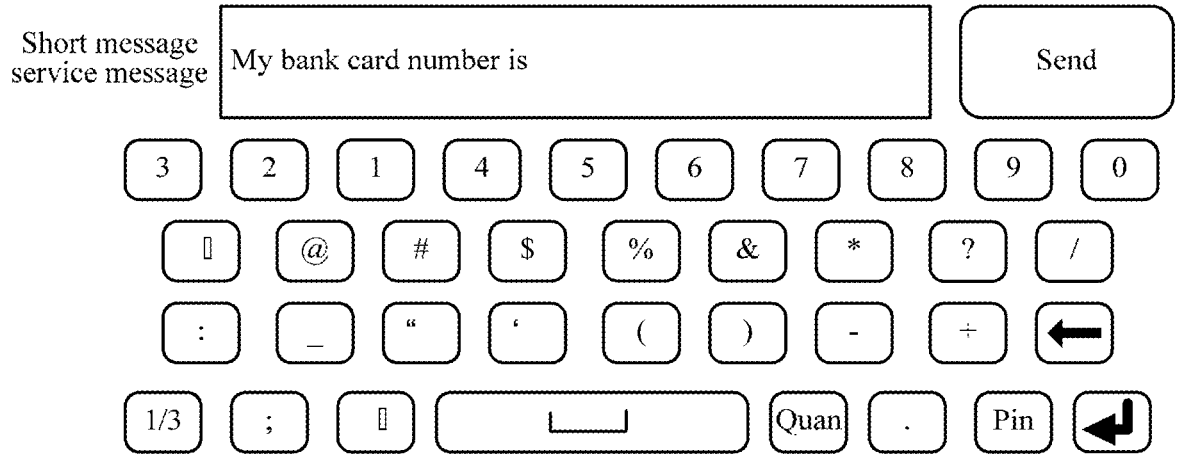
FIG. 2c is a schematic diagram 3 of a displayed keyboard according to an embodiment of the present invention.
Figure 2D:
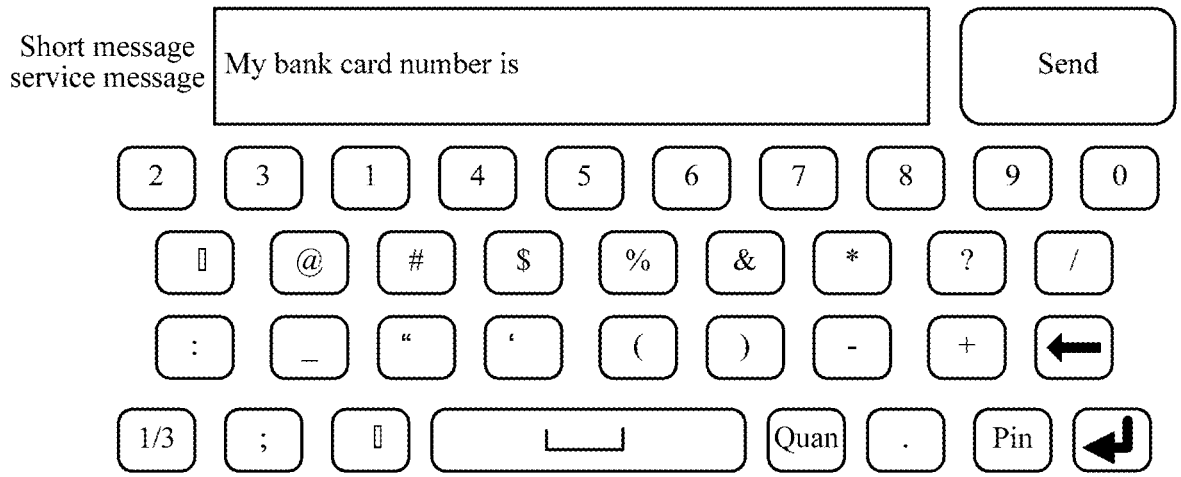
FIG. 2d is a schematic diagram 4 of a displayed keyboard according to an embodiment of the present invention.

There may be multiple manners for adjusting, by the terminal, the arrangement order of the keys on the keyboard. Specifically, the terminal may randomly adjust the arrangement order of the keys on the keyboard; or the terminal may adjust the arrangement order of the keys on the keyboard according to a key that is selected by the touching object on the keyboard and a movement track of the touching object on the keyboard; or the terminal may adjust the arrangement order of the keyboard according to multiple keys that are selected by the touching object on the keyboard and a location replacement instruction of the touching object on the keyboard. For example, referring to FIG. 2b, a terminal detects that a touching object selects a key "1" on a keyboard, and drags the key "1" to a key "3". In this case, locations of the key "1" and the key "3" are replaced with each other (referring to FIG. 2c), or the terminal arranges the key "1" after the key "3" (referring to FIG. 2d).

By means of the technical solution, an arrangement order of keys on a keyboard is adjusted according to a distance between a touching object and a terminal touchscreen, so that information that is actually input by a user is different from information obtained by means of calculation by an attacker according to a keyboard layout and a touch point of the user, thereby avoiding leakage of key information.

Optionally, in the foregoing step 120, the terminal may adjust an arrangement order of all keys on the keyboard. Specifically, when detecting that the distance between the touching object and the touchscreen is less than or equal to the first preset threshold, the terminal may adjust the arrangement order of all the keys on the keyboard. By means of the technical solution, an order of keys on a keyboard is adjusted according to a distance between a touching object and a touchscreen of a terminal, thereby avoiding leakage of key information.

Based on the keyboard adjustment process, although an effect that leakage of key information is avoided can be achieved by adjusting all keys on a keyboard displayed by a terminal, when an arrangement order of only some keys instead of all keys on the keyboard displayed by the terminal is adjusted, a problem of difficulty in determining a location of a key after an arrangement order of all the keys is adjusted is avoided and an information input speed is improved. In addition, compared with that the terminal adjusts the arrangement order of all the keys on the keyboard displayed by the terminal, because the terminal adjusts an arrangement order of only some keys on the keyboard displayed by the terminal, the terminal can process less information when adjusting the keyboard, the terminal can adjust an arrangement order of the keyboard more quickly, and energy consumption of the terminal can be reduced.

Step 130: Display the adjusted keyboard on the touchscreen.

In this embodiment of the present invention, when adjusting the arrangement order of all the keys on the touchscreen, the terminal may directly present a keyboard obtained after the arrangement order of all the keys are adjusted. When adjusting the arrangement order of some keys on the keyboard of the touchscreen, the terminal scales up, in a preset manner, the keys whose arrangement order is adjusted, for displaying. The keys whose arrangement order is adjusted may cover the keyboard in a preset manner, or the keys whose arrangement order is adjusted may be displayed on a specified location of a terminal screen in a preset manner. The specified location may be determined according to a specific application scenario. Alternatively, the terminal displays all the keys on the keyboard. All the keys include the keys whose arrangement order is adjusted and a key whose arrangement order is not adjusted.

Optionally, the displaying, in the preset manner, the keys whose arrangement order is adjusted includes: presenting, in a rectangle, the keys whose arrangement order is adjusted, and dividing the rectangle into N parts, where each part, which is obtained by means of dividing, of the rectangle corresponds to a key whose arrangement order is adjusted, for example, the matrix is a nine box grid; or presenting, in a circle or a loop, the keys whose arrangement order is adjusted, and dividing the circle or the loop into N parts, where each part obtained by means of dividing corresponds to a key whose arrangement order is adjusted, where N is equal to a quantity of the keys whose arrangement order is adjusted.

Further, after step 130, that is, after the terminal presents the adjusted keyboard, the method further includes: if the order of all the keys on the keyboard of the terminal is adjusted, when it is detected that the distance between the touching object and the touchscreen of the terminal is greater than a second preset threshold, restoring the order of all the keys to a normal arrangement order; or if the arrangement order of some keys on the keyboard of the terminal is adjusted, when it is detected that the distance between the touching object and the touchscreen of the terminal is greater than a second preset threshold, restoring the order of the keys to a normal arrangement order; or when it is detected that the location, which the touching object points to, on the keyboard is out of the preset range, restoring the order of the keys to a normal arrangement order. The second preset threshold may be equal to the first preset threshold, or may be not equal to the first preset threshold.

Based on the technical solution, the following describes a process in which a terminal displays a keyboard in detail with reference to specific application scenarios.

Application Scenario 1

Figure 3:
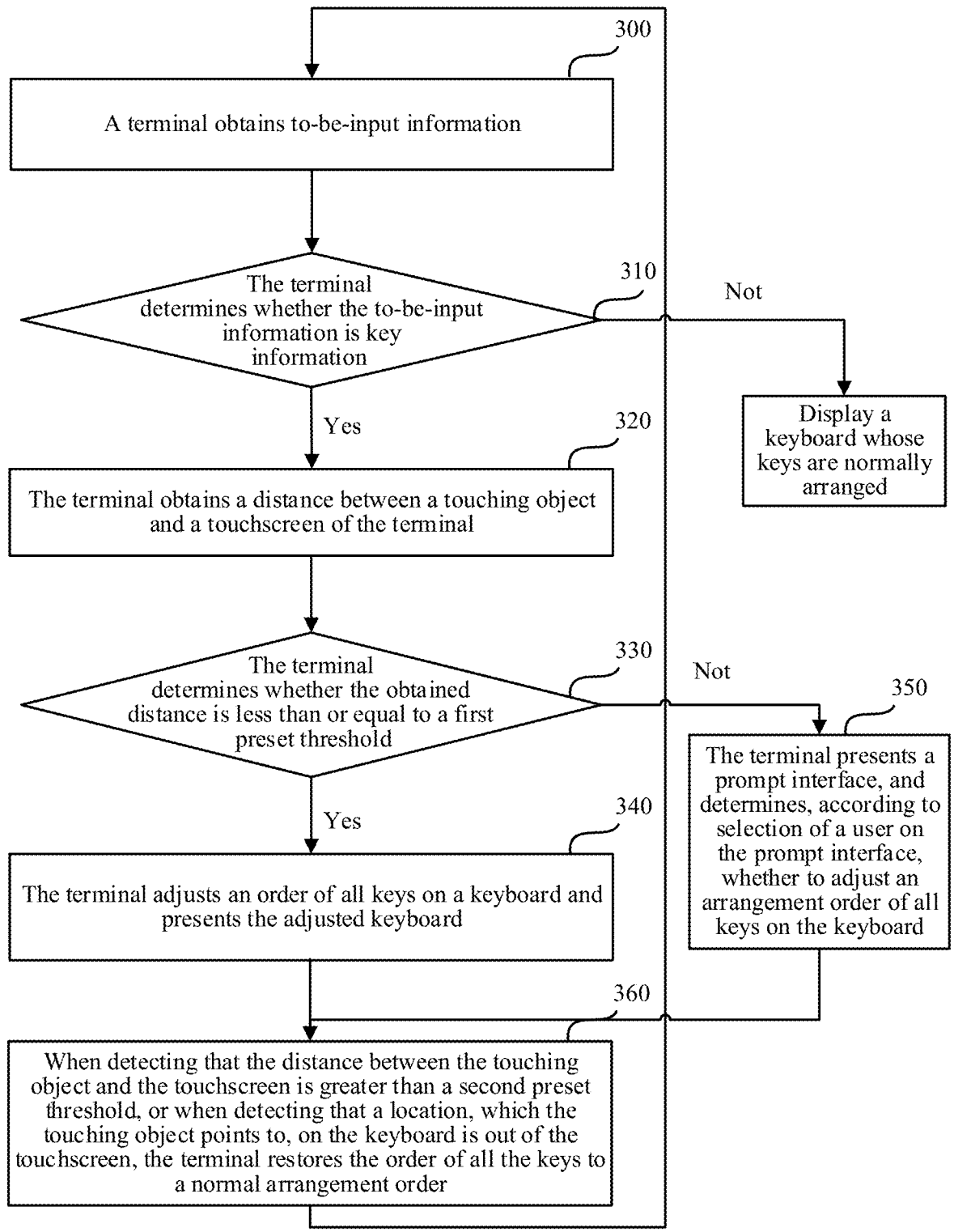
FIG. 3 is a flowchart of a method for displaying a keyboard in specific application scenario 1 according to an embodiment of the present invention.

Referring to FIG. 3, in an embodiment of the present invention, a method for locally displaying a keyboard by a terminal includes:

Step 300: A terminal obtains to-be-input information.

Step 310: The terminal determines whether the to-be-input information is key information; and if yes, performs step 320; otherwise, displays a keyboard whose keys are normally arranged.

Step 320: The terminal obtains a distance between a touching object and a touchscreen of the terminal.

Step 330: The terminal determines whether the obtained distance is less than or equal to a first preset threshold; and if yes, perform step 340; otherwise, perform step 350.

Step 340: The terminal adjusts an order of all keys on the keyboard and presents the adjusted keyboard.

Figure 4A:
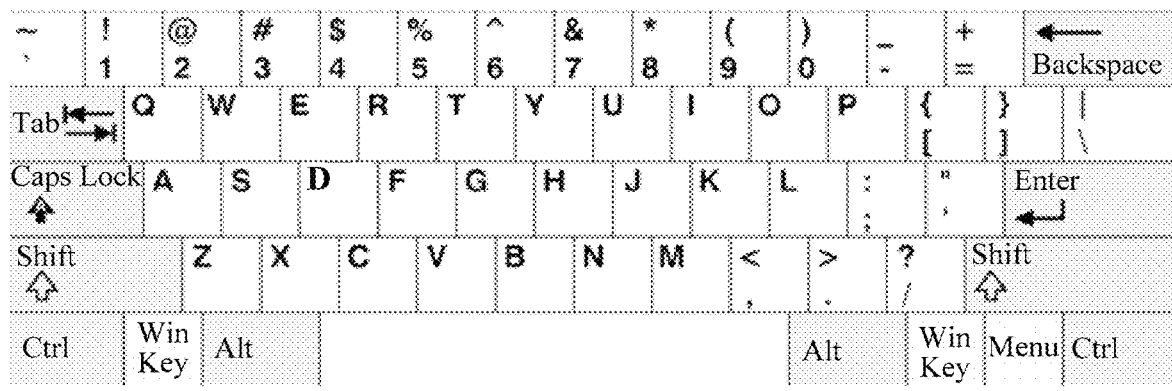
FIG. 4a and FIG. 4b are schematic diagrams of displayed keyboards in specific application scenario 1 according to an embodiment of the present invention.
Figure 4B:
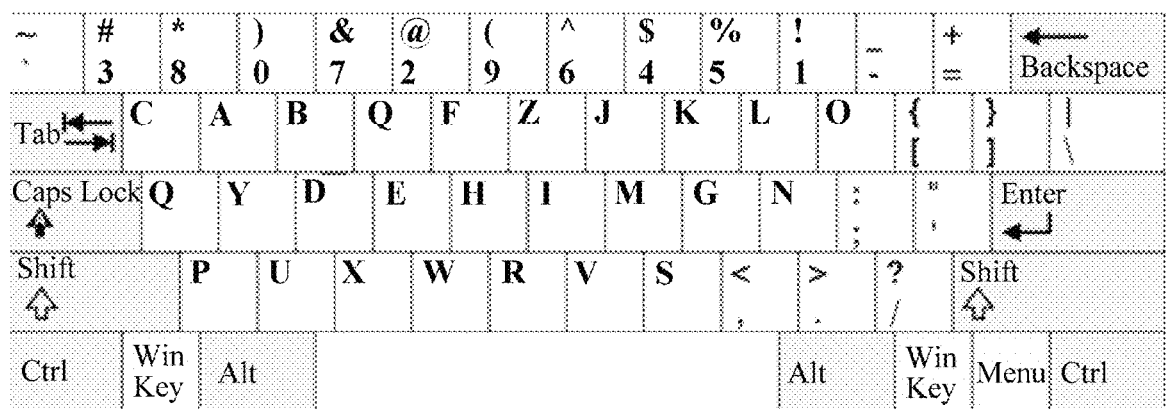

In this embodiment of the present invention, FIG. 4a shows a keyboard, whose keys are normally arranged, of a terminal. FIG. 4b shows a keyboard obtained after an order of all keys is adjusted.

Step 350: The terminal presents a prompt screen, and determines, according to selection of a user on the prompt screen, whether to adjust the arrangement order of all the keys on the keyboard.

Optionally, after step 340 and step 350, that is, after the terminal displays the adjusted keyboard, the method may further include step 360. In step 360, when detecting that the distance between the touching object and the touchscreen is greater than a second preset threshold, or when detecting that the location, which the touching object points to, on the keyboard is out of the touchscreen, the terminal restores an order of all keys to a normal arrangement order, and then, return to step 300, to continue to obtain to-be-input information.

By means of the technical solution, an arrangement order of keys on a keyboard is adjusted according to a distance between a touching object and a touchscreen of a terminal, thereby avoiding leakage of key information.

Application Scenario 2

Figure 5:
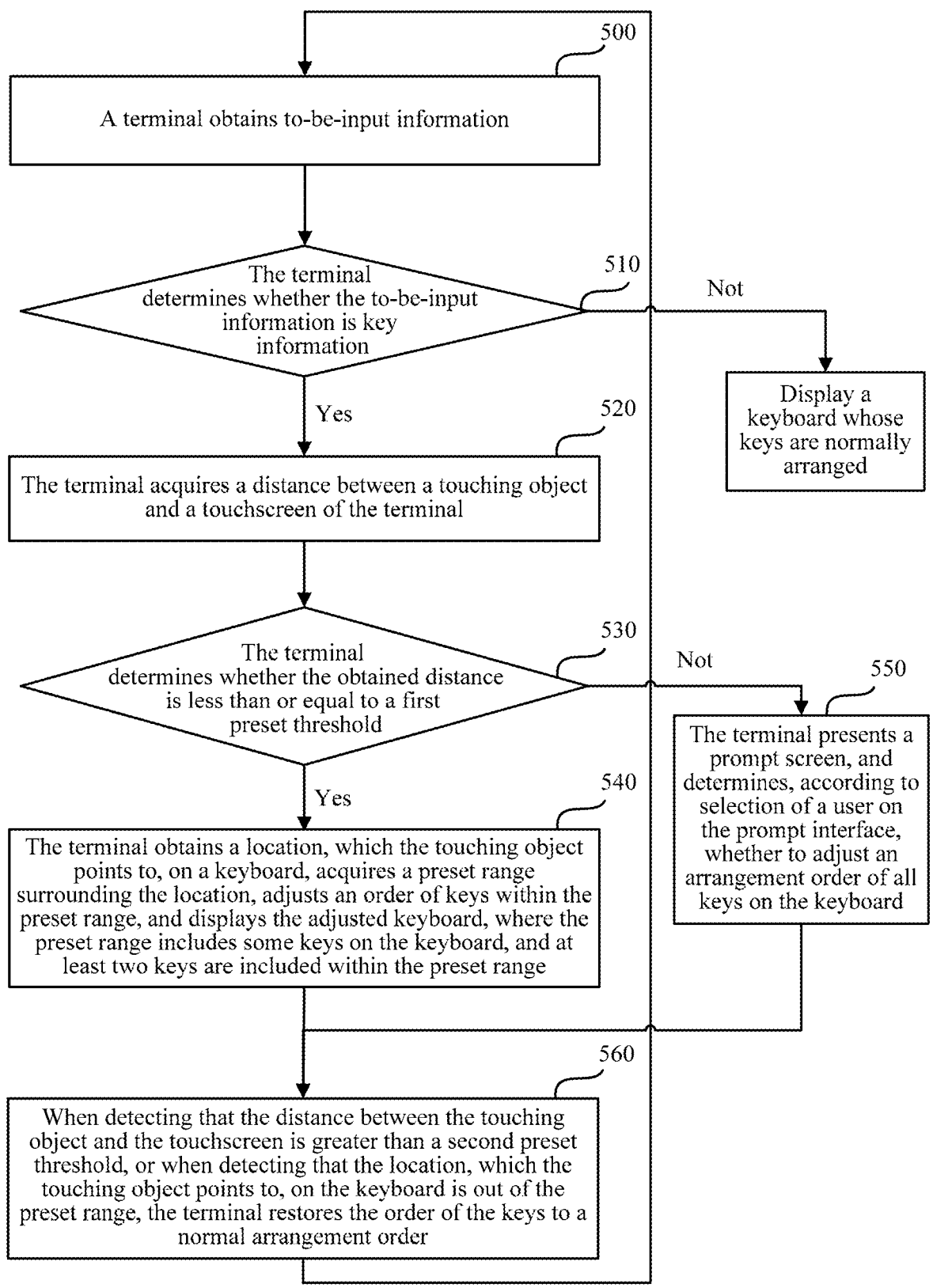
FIG. 5 is a flowchart of a method for displaying a keyboard in specific application scenario 2 according to an embodiment of the present invention.

Referring to FIG. 5, in an embodiment of the present invention, a process of locally displaying a keyboard by a terminal includes:

Step 500: A terminal obtains to-be-input information.

Step 510: The terminal determines whether the to-be-input information is key information; and if yes, performs step 520; otherwise, displays a keyboard whose keys are normally arranged.

Step 520: The terminal obtains a distance between a touching object and a touchscreen of the terminal.

Step 530: The terminal determines whether the obtained distance is less than or equal to a first preset threshold; and if yes, perform step 540; otherwise, perform step 550.

Step 540: The terminal obtains a location, which the touching object points to, on the keyboard, obtains a preset range surrounding the location, adjusts an order of keys within the preset range, and displays the adjusted keyboard, where the preset range includes some keys on the keyboard, and the preset range includes at least two keys.

Figure 6A:
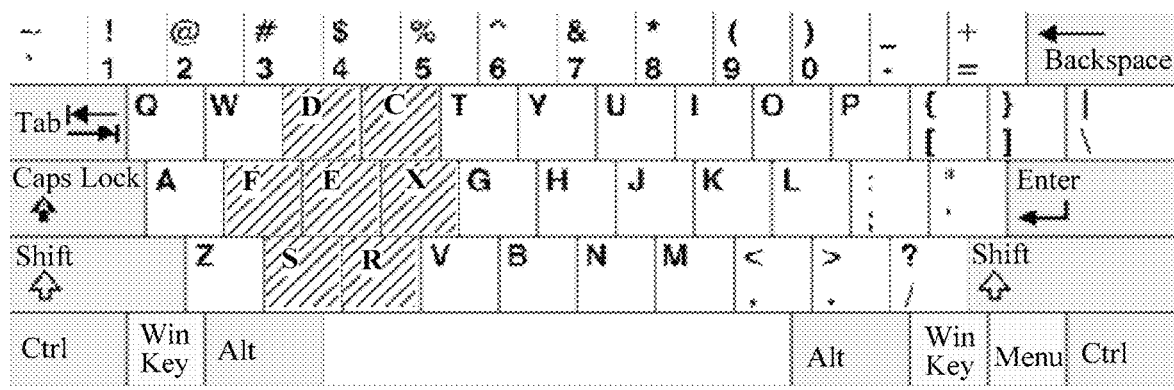
FIG. 6a and FIG. 6b are schematic diagrams of displayed keyboards in specific application scenario 2 according to an embodiment of the present invention.
Figure 6B:
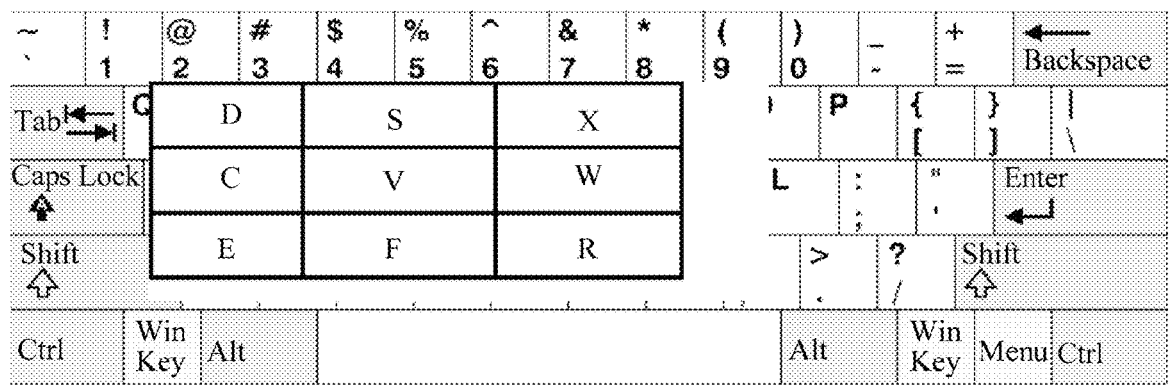

In this embodiment of the present invention, in this embodiment of the present invention, a keyboard whose keys are normally arranged is shown in FIG. 4a. When an arrangement order of keys on the keyboard is adjusted, the keys whose arrangement order is adjusted and keys whose arrangement order is not adjusted may form a keyboard, which is shown in FIG. 6a. Alternatively, keys whose order is adjusted may be scaled up and displayed in a nine box grid on the keyboard, which is shown in FIG. 6b.

Step 550: The terminal displays a prompt screen, and determines, according to selection of a user on the prompt screen, whether to adjust an arrangement order of some keys on the keyboard.

Optionally, after step 540 and step 550, that is, after the terminal displays the adjusted keyboard, the method may further include step 560. In step 560, when detecting that the distance between the touching object and the touchscreen is greater than a second preset threshold, or when detecting that the location, which the touching object points to, on the keyboard is out of the preset range, the terminal restores the order of the keys to a normal arrangement order, and then, return to step 500, to continue to obtain to-be-input information.

By means of the technical solution in this embodiment of the present invention, before a touching object touches a touchscreen, an arrangement order of some keys on a keyboard displayed by a terminal is adjusted, so that a character obtained by an attacker by using a location of a touch point of a user on a screen of the terminal is different from a character that is actually input by the user, thereby avoiding leakage of key information and ensuring security of the key information. In addition, an arrangement order of only some keys instead of all keys on the keyboard displayed by the terminal is adjusted, thereby avoiding a problem of difficulty in determining a location of a key after an arrangement order of all the keys is adjusted and improving an information input speed. Moreover, because an arrangement order of only some keys on the keyboard displayed by the terminal is adjusted, the terminal can process less information when adjusting the keyboard, the terminal can adjust an arrangement order of the keyboard more quickly, and energy consumption of the terminal can be reduced.

Figure 7:
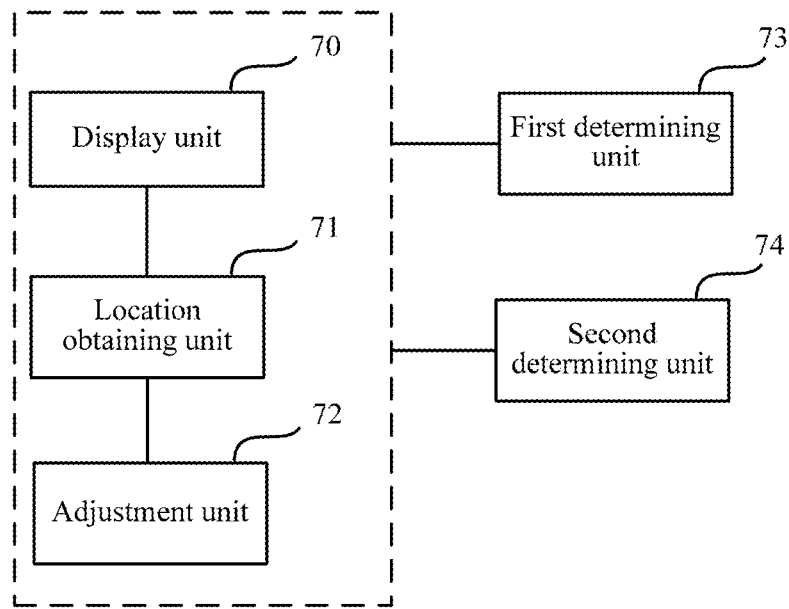
FIG. 7 is a schematic structural diagram of an apparatus for displaying a keyboard according to an embodiment of the present invention.

Based on the technical solution, referring to FIG. 7, in an embodiment of the present invention, an apparatus for displaying a keyboard is further provided, including a display unit 70, a location obtaining unit 71, and an adjustment unit 72.

The display unit 70 is configured to display, on a touchscreen, a keyboard whose keys are normally arranged.

The location obtaining unit 71 is configured to: before a touching object touches the keyboard on the touchscreen, obtain a location, which the touching object points to, on the keyboard.

The adjustment unit 72 is configured to adjust an arrangement order of some keys on the keyboard displayed by the display unit 70, where the keys include keys within a preset range, the preset range includes the location, which the touching object points to and which is obtained by the location obtaining unit 71, on the keyboard, and the preset range includes at least two keys.

The display unit 70 is further configured to display, on the touchscreen, the keyboard adjusted by the adjustment unit 72.

Further, the apparatus for displaying a keyboard further includes a first determining unit 73. The first determining unit 73 is configured to: before the location obtaining unit 71 obtains the location, which the touching object points to, on the keyboard, determine that to-be-input information is key information.

Optionally, the first determining unit 73 is specifically configured to: before the location obtaining unit 71 obtains the location, which the touching object points to, on the keyboard, obtain an attribute information type of an input box that is currently presented for information input, and when the attribute information type of the input box is a key information type, determine that the to-be-input information is key information; or before the location obtaining unit 71 obtains the location, which the touching object points to, on the keyboard, obtain a keyword included in information that is already input to an input box that is currently presented for information input, and when a preset keyword set includes the obtained keyword, determine that the to-be-input information is key information.

Further, the apparatus for displaying a keyboard further includes a second determining unit 74. The second determining unit 74 is configured to: before the adjustment unit 72 adjusts the arrangement order of the keys on the keyboard, obtain a distance between the touching object and the touchscreen; and determine that the obtained distance is less than or equal to a first preset threshold.

Optionally, the adjustment unit 72 is specifically configured to: randomly adjust the arrangement order of the keys on the keyboard; or adjust the arrangement order of the keys on the keyboard according to a movement track of the touching object on the keyboard.

Optionally, when displaying the adjusted keyboard on the touchscreen, the display unit 70 is specifically configured to: scale up, according to a preset percentage, the keys whose arrangement order is adjusted, and display, in a preset manner, the keys that are scaled up; or display all keys on the keyboard, where all the keys include the keys whose arrangement order is adjusted and a key whose arrangement order is not adjusted.

Optionally, when displaying, in the preset manner, the keys that are scaled up, the display unit 70 is specifically configured to: display, in a rectangle, the keys whose arrangement order is adjusted, where the rectangle is divided into N parts, and each part, which is obtained by means of dividing, of the rectangle corresponds to a key whose arrangement order is adjusted; or display, in a circle, the keys whose order is adjusted, where the circle loop is divided into N parts, and each part, which is obtained by means of dividing, of the circle corresponds to a key whose arrangement order is adjusted; or display, in a loop, the keys whose order is adjusted, where the loop is divided into N parts, and each part, which is obtained by means of dividing, of the loop corresponds to a key whose arrangement order is adjusted; and N is equal to a quantity of the keys whose arrangement order is adjusted.

Optionally, the adjustment unit 72 is further configured to: after the display unit 70 displays the adjusted keyboard on the touchscreen, when it is detected that the distance between the touching object and the touchscreen is greater than a second preset threshold, restore the order of the keys to a normal arrangement order; or after the display unit 70 displays the adjusted keyboard on the touchscreen, when it is detected that the location, which the touching object points to, on the keyboard is out of the preset range, restore the order of the keys to a normal arrangement order.

Figure 8:
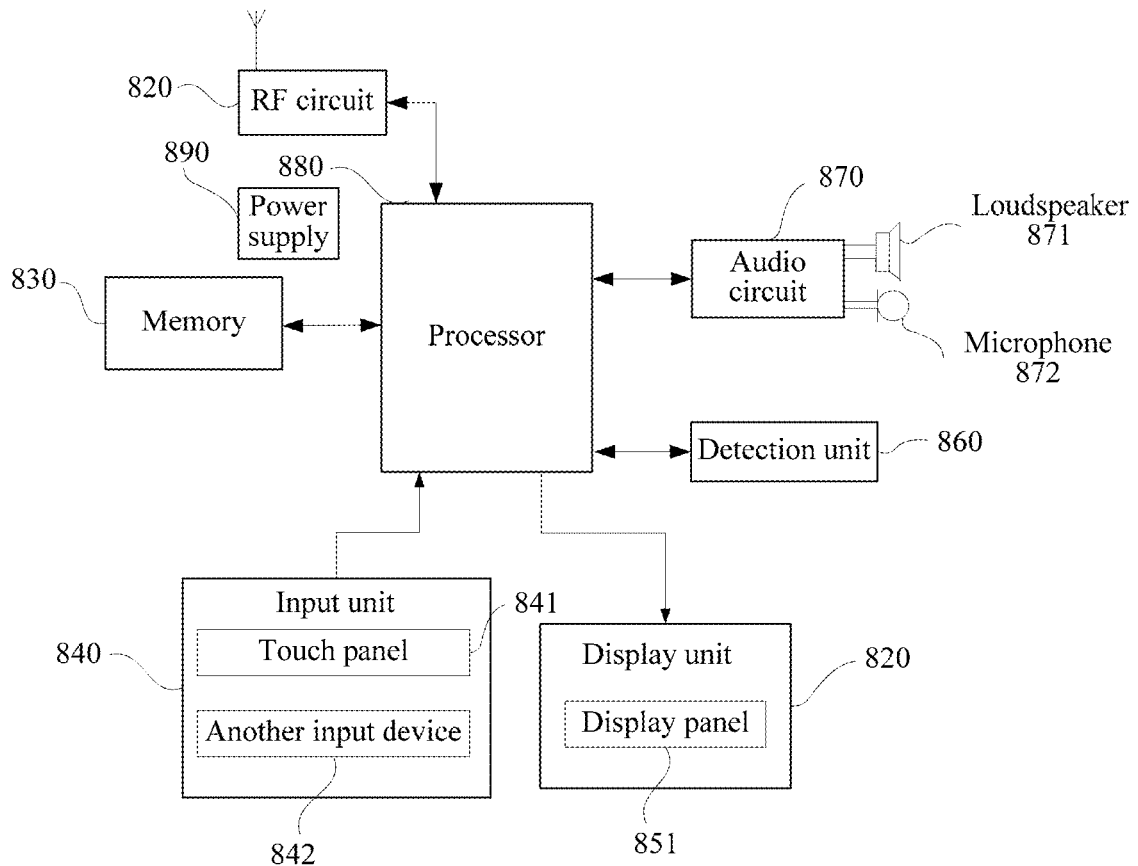
FIG. 8 is a schematic structural diagram of a terminal device according to an embodiment of the present invention.

Based on the technical solution, referring to FIG. 8, FIG. 8 is a schematic structural diagram of a terminal device according to an embodiment of the present invention. The terminal device provided in this embodiment of the present invention may be used to implement methods for implementing embodiments of the present invention shown in FIG. 1 to FIG. 6. For ease of description, only a part related to this embodiment of the present invention is shown. For specific technical details that are not disclosed, refer to embodiments of the present invention shown in FIG. 1 to FIG. 6.

The mobile terminal may be a terminal device such as a mobile phone, a tablet computer, a notebook computer, a UMPC (Ultra-mobile Personal Computer, ultra-mobile personal computer), a netbook, or a PDA (Personal Digital Assistant, personal digital assistant). In this embodiment of the present invention, a description is provided by using an example in which the mobile terminal is a mobile phone. FIG. 8 is a block diagram of a partial structure of a mobile phone 800 related to each embodiment of the present invention.

As shown in FIG. 8, the mobile phone 800 includes components such as an RF (radio frequency, radio frequency) circuit 820, a memory 830, an input unit 840, a display unit 850, a detection unit 860, an audio circuit 870, a processor 880, and a power supply 890. A person skilled in the art may understand that a structure of the mobile phone shown in FIG. 8 does not constitute a limitation on a mobile phone, and the mobile phone may include more components or fewer components than those shown in the figure, or some components may be combined, or a different component deployment may be used.

The following specifically describes the components of the mobile phone 800 with reference to FIG. 8.

The RF circuit 820 may be configured to receive and send signals during an information receiving and sending process or a call process. Particularly, the RF circuit 820 receives downlink information from a base station, then delivers the downlink information to the processor 880 for processing, and sends uplink data to the base station. Generally, the RF circuit includes, but is not limited to an antenna, at least one amplifier, a transceiver, a coupler, an LNA (low noise amplifier, low noise amplifier), a duplexer, and the like. In addition, the RF circuit 820 may also communicate with a network and another device by means of wireless communication. The wireless communication may use any communications standard or protocol, including but not limited to GSM (Global System of Mobile Communication, Global System for Mobile communications), GPRS (General Packet Radio Service, General Packet Radio Service), CDMA (Code Division Multiple Access, Code Division Multiple Access), WCDMA (Wideband Code Division Multiple Access, Wideband Code Division Multiple Access), LTE (Long Term Evolution), an e-mail, an SMS (Short Messaging Service, short message service), and the like.

The memory 830 may be configured to store a software program and a module. The processor 880 runs the software program and the module stored in the memory 830, to implement various functional applications and data processing of the mobile phone 800. The memory 830 may mainly include a program storage area and a data storage area. The program storage area may store an operating system, an application program required by at least one function (such as a sound playing function and an image display function), and the like. The data storage area may store data (such as audio data, image data, and an address book) created according to use of the mobile phone 800, and the like. In addition, the memory 830 may include a high-speed random access memory, and may also include a non-volatile memory such as at least one disk storage component, a flash memory component, or another volatile solid-state storage component.

The input unit 840 may be configured to receive input digit or character information, and generate keyboard signal input related to a user setting and function control of the mobile phone 300. Specifically, the input unit 840 may include a touchscreen 841 and another input device 842. The touchscreen 841, which may also be referred to as a touch panel, may collect a touch operation of a user on or near the touchscreen (such as an operation of a user on or near the touchscreen 841 by using any suitable object or accessory such as a finger or a stylus), and drive a corresponding connection apparatus according to a preset program. Optionally, the touchscreen 841 may include two parts: a touch detection apparatus and a touch controller. The touch detection apparatus detects a touch location of the user, detects a signal generated by the touch operation, and transfers the signal to the touch controller. The touch controller receives touch information from the touch detection apparatus, converts the touch information into touch point coordinates, and then sends the touch point coordinates to the processor 880. Moreover, the touch controller can receive and execute a command sent from the processor 880. In addition, the touchscreen 841 may be implemented in various types such as resistance-type, capacitance-type, infrared, and surface acoustic wave. In addition to the touchscreen 841, the input unit 840 may further include the another input device 842. Specifically, the another input device 342 may include, but is not limited to, one or more of a physical keyboard, a functional key (such as a volume control key or a switch key), a trackball, a mouse, and a joystick.

The display unit 850 may be configured to display information input by the user or information provided for the user, and various menus of the mobile phone 800. The display unit 850 may include a display panel 851. Optionally, the display panel 841 may be configured by using an LCD (Liquid Crystal Display, liquid crystal display), an OLED (Organic Light-Emitting Diode, organic light-emitting diode), or the like. Further, the touchscreen 841 may cover the display panel 851. After detecting a touch operation on or near the touchscreen 841, the touchscreen 841 transfers the touch operation to the processor 880, so as to determine a type of the touch event. Then, the processor 880 provides a corresponding visual output on the display panel 851 according to the type of the touch event. Although in FIG. 8, the touchscreen 841 and the display panel 851 are used as two separate parts to implement input and output functions of the mobile phone 800, in some embodiments, the touchscreen 841 and the display panel 851 may be integrated to implement the input and output functions of the mobile phone 800.

The detection unit 860 may be configured to identify a touching object, detect a location, to which the touching object points, above the touchscreen 841 of the mobile phone, and obtain a distance between the touching object and the touchscreen of the mobile phone. The detection unit 860 may include several cameras separately installed on horizontal and vertical frames, which are perpendicular to each other, of an edge of the touchscreen of a terminal screen, to collect an image generated above the touchscreen and further obtain the location, to which the touching object points to, on the touchscreen and the distance between the touching object and the touchscreen. Alternatively, the detection unit 860 may include infrared sensors installed on horizontal and vertical frames, which are perpendicular to each other, of an edge of the touchscreen of a terminal screen, to obtain the location, to which the touching object points to, on the touchscreen and the distance between the touching object and the touchscreen. Alternatively, the detection unit 860 may include several capacitance plates installed below the touchscreen. When the touching object approaches the touchscreen, the capacitance plate can generate a corresponding capacitance. When the touching object is located at different locations above the touchscreen, capacitances detected by the capacitance plate are different. When a distance from the touching object to the touchscreen changes, a capacitance corresponding to the capacitance plate also changes. By detecting changes of the capacitance, the distance between the touching object and the touchscreen is obtained. In addition, the detection unit 860 may also obtain the location, to which the touching object points, on the touchscreen and the distance between the touching object and the touchscreen by using a component for measuring inductance or magnetic field intensity and by means of changes of inductance or a magnetic field.

The mobile phone 800 may further include other various sensors, for example, an optical sensor and a gravity sensor. Specifically, the optical sensor may include an ambient light sensor and an optical proximity sensor. The ambient light sensor may adjust luminance of the display panel 841 according to brightness of the ambient light. The optical proximity sensor may detect whether an object approaches or touches the mobile phone. The proximity sensor may switch off the display panel 841 and/or backlight when the mobile phone 800 is moved to the ear. The gravity sensor (gravity sensor) may detect magnitude of accelerations of the mobile phone in various directions (generally on three axes), may detect magnitude and a direction of the gravity when static, and may be configured to identify an application of a mobile phone gesture (such as switchover between landscape mode and portrait mode, a related game, and gesture calibration of a magnetometer), a function related to vibration recognition (such as a pedometer and a knock), and the like. Another sensor, such as a gyroscope, a barometer, a hygrometer, a thermometer, or an infrared sensor may be configured in the mobile phone 800, which is not described herein again.

The audio circuit 870, a speaker 871, and a microphone 872 may provide an audio screen between a user and the mobile phone 800. The audio circuit 870 may convert received audio data into an electrical signal and transmit the electrical signal to the loudspeaker 871. The loudspeaker 871 converts the electrical signal into a sound signal for output. On the other hand, the microphone 872 converts a collected sound signal into an electrical signal. The audio circuit 870 receives the electrical signal, converts the electrical signal into audio data, and outputs the audio data to the RF circuit 820, so as to send the audio data to, for example, another mobile phone, or outputs the audio data to the memory 830 for further processing.

The processor 880 is a control center of the mobile phone 800, and is connected to various parts of the whole mobile phone by using various screens and lines. By running or executing the software program and/or the module stored in the memory 830, and invoking the data stored in the memory 830, the processor 880 performs various functions and data processing of the mobile phone 800, thereby performing overall monitoring on the mobile phone. Optionally, the processor 880 may include one or more processing units. Preferably, the processor 880 may be integrated with an application processor and a modem processor. The application processor mainly processes an operating system, a user screen, an application program, and the like. The modem processor mainly processes wireless communication. It may be understood that the modem processor may be not integrated into the processor 880.

The mobile phone 800 further includes the power supply 890 (such as a battery) for supplying power to the components. Preferably, the power supply may be logically connected to the processor 880 by using a power management system, thereby implementing functions such as charging, discharging and power consumption management by using the power management system.

Although not shown, the mobile phone 800 may further include a WiFi (wireless fidelity, wireless fidelity) module, a Bluetooth module, and the like, which is not described in detail herein.

In this embodiment of the present invention, the display unit 850 is configured to display, on a touchscreen, a keyboard whose keys are normally arranged.

The detection unit 860 is configured to identify a touching object, and before the touching object touches the keyboard on the touchscreen, obtain a key location, which the touching object points to, on the keyboard displayed by the display unit.

The processor 880 is configured to run the software program and the module stored in the memory, to perform the following operation: adjusting an arrangement order of some keys on the keyboard displayed by the display unit, where the keys include keys within a preset range, the preset range includes the location, which the touching object points to and which is obtained by the sensor, on the keyboard, and the preset range includes at least two keys.

The display unit 850 is further configured to display, on the touchscreen, the keyboard adjusted by the processor.

Further, the processor 880 is further configured to: before the location, which the touching object points to, on the keyboard is obtained, determine that to-be-input information is key information.

Further, when determining that the to-be-input information is key information, the processor 880 is specifically configured to: obtain an attribute information type of an input box that is currently presented for information input, and when the attribute information type of the input box is a key information type, determine that the to-be-input information is key information; or obtain a keyword included in information that is already input to an input box that is currently presented for information input, and when a preset keyword set includes the obtained keyword, determine that the to-be-input information is key information.

Further, the detection unit 860 is further configured to: before the arrangement order of the keys on the keyboard is adjusted, obtain a distance between the touching object and the touchscreen, and send the distance between the touching object and the touchscreen to the processor; and the processor 880 is configured to determine that the distance obtained by the detection unit 860 is less than or equal to a first preset threshold.

Further, when adjusting the arrangement order of the keys on the keyboard, the processor 880 is specifically configured to: randomly adjust the arrangement order of the keys on the keyboard; or adjust the arrangement order of the keys on the keyboard according to a movement track of the touching object on the keyboard.

Optionally, when displaying the adjusted keyboard on the touchscreen, the display unit 850 is specifically configured to: scale up, according to a preset percentage, the keys whose arrangement order is adjusted, and display, in a preset manner, the keys that are scaled up; or display all keys on the keyboard, where all the keys include the keys whose arrangement order is adjusted and a key whose arrangement order is not adjusted.

Optionally, when displaying, in the preset manner, the keys that are scaled up, the display unit 850 is specifically configured to: display, in a rectangle, the keys whose arrangement order is adjusted, where the rectangle is divided into N parts, and each part, which is obtained by means of dividing, of the rectangle corresponds to a key whose arrangement order is adjusted; or display, in a circle, the keys whose order is adjusted, where the circle loop is divided into N parts, and each part, which is obtained by means of dividing, of the circle corresponds to a key whose arrangement order is adjusted; or display, in a loop, the keys whose order is adjusted, where the loop is divided into N parts, and each part, which is obtained by means of dividing, of the loop corresponds to a key whose arrangement order is adjusted; and N is equal to a quantity of the keys whose arrangement order is adjusted.

Further, the processor 880 is further configured to: after the adjusted keyboard is displayed on the touchscreen, when it is detected that the distance between the touching object and the touchscreen is greater than a second preset threshold, restore the order of the keys to a normal arrangement order; or after the adjusted keyboard is displayed on the touchscreen, when it is detected that the location, which the touching object points to, on the keyboard is out of the preset range, restore the order of the keys to a normal arrangement order.

In conclusion, in this embodiment of the present invention, when determining that to-be-input information is key information, a terminal obtains a distance between a touching object and a touchscreen. When the obtained distance is less than or equal to a first preset threshold, the terminal adjusts the order of the keys on a keyboard displayed on the touchscreen and presents the adjusted keyboard. By means of the technical solution in the present invention, before a touching object touches a touchscreen, an arrangement order of some keys on a keyboard displayed by a terminal is adjusted, so that a character obtained by an attacker by using a location of a touch point of a user on a screen of the terminal is different from a character that is actually input by the user, thereby avoiding leakage of key information and ensuring security of the key information. In addition, an arrangement order of only some keys instead of all keys on the keyboard displayed by the terminal is adjusted, thereby avoiding a problem of difficulty in determining a location of a key after an arrangement order of all the keys is adjusted and improving an information input speed. Moreover, because an arrangement order of only some keys on the keyboard displayed by the terminal is adjusted, the terminal can process less information when adjusting the keyboard, the terminal can adjust an arrangement order of the keyboard more quickly, and energy consumption of the terminal can be reduced.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage mediums (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although some preferred embodiments of the present invention are already described, a person skilled in the art can make changes and modifications to these embodiments once they learn the basic inventive concept. Therefore, the following claims are intended to be construed as to cover the example embodiments and all changes and modifications falling within the scope of the present invention.

Obviously, a person skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A method for displaying a keyboard, the method comprising:
   displaying, on a touchscreen of an electronic device, a keyboard having keys arranged according to a first arrangement of the keys, the keys including a first key and a second key such that the first key is displayed at first location on the keyboard and the second key is located at a second location on the keyboard in the first arrangement of the keys;
   before a touching object touches the displayed keyboard on the touchscreen, determining a touch location on the displayed keyboard that the touching object points to;
   determining whether the touch location is within a predefined area on the displayed keyboard, wherein the predefined area comprising the first key and the second key;
   in response to the determination that the touch location is within the predefined area on the displayed keyboard, adjusting the first arrangement of the keys into a second arrangement of the keys;
   displaying the keyboard on the touchscreen according to the second arrangement of the keys, wherein
   in the second arrangement of the keys, the first key is displayed at the second location on the keyboard, and the second key is displayed at the first location on the keyboard; and
   wherein before determining the touch location on the displayed keyboard that the touching object points to, the method further comprises:
      obtaining an attribute information type of an input box presented for information input, and when the attribute information type of the input box is of a first type, determining that the to-be-input information is the information of the first type.

2. The method according to claim 1, wherein before determining the touch location on the keyboard that the touching object points to, the method further comprises:
   obtaining a keyword in information that is already input to an input box presented for the information input, and when a preset keyword set comprises the obtained keyword, determining that to-be-input information is the information of a first type.

3. The method according to claim 1, wherein before adjusting the first arrangement of the keys into the second arrangement of the keys, the method further comprises:
   obtaining a distance between the touching object and the touchscreen; and
   determining that the obtained distance is less than or equal to a first preset threshold.

4. The method according to claim 3, wherein adjusting the first arrangement of the keys into the second arrangement of the keys comprises:
   randomly adjusting an arrangement order of the keys on the keyboard; or
   adjusting the first arrangement of the keys according to a movement track of the touching object on the keyboard.

5. The method according to claim 1, wherein displaying the keyboard on the touchscreen according to the second arrangement of the keys comprises:
   scaling up, according to a preset percentage, the first key and the second key, and displaying, in a preset manner, the first key and the second key that are scaled up; or
   displaying all keys on the keyboard, wherein all the keys comprise the first key and the second key and at least one key whose location on the keyboard is not adjusted.

6. The method according to claim 5, wherein displaying, in the preset manner, the first key and the second key that are scaled up comprises:
   displaying the adjusted arrangement of the keys in a rectangle, wherein the rectangle is divided into N parts, and each of the N parts of the rectangle corresponds to at least one of the adjusted keys; or
   displaying the adjusted arrangement of the keys in a circle, wherein the circle is divided into N parts, and each of the N parts of the circle corresponds to at least one of the adjusted keys; or displaying the adjusted arrangement of the keys in a loop, wherein the loop is divided into N parts, and each of the N parts of the loop corresponds to at least one of the adjusted keys; and wherein;

N is equal to a quantity of the adjusted keys.

7. The method according to claim 1, wherein after displaying the keyboard on the touchscreen according to the second arrangement of the keys, the method further comprises:

when it is detected that a distance between the touching object and the touchscreen is greater than a second preset threshold, restoring the first arrangement of the keys; or when it is detected that the location on the keyboard that the touching object points to is out of a preset range, restoring the first arrangement of the keys.

8. A terminal device, comprising:

a memory, configured to store a software program;

a processor, configured to:

control a touchscreen to display a keyboard having keys arranged according to a first arrangement of the keys, the keys including a first key and a second key such that the first key is displayed at first location on the keyboard and the second key is located at a second location on the keyboard in the first arrangement of the keys;

before a touching object touches the keyboard on the touchscreen, determine a touch location on the displayed keyboard that the touching object points to;

determine whether the touch location is within a predefined area on the displayed keyboard, wherein the predefined area comprising the first key and the second key;

in response to the determination that the touch location is within the predefined area on the displayed keyboard, adjust the first arrangement of the keys into a second arrangement of the keys; and control the touchscreen to display the keyboard on the touchscreen according to the second arrangement of the keys, wherein in the second arrangement of the keys, the first key is displayed at the second location on the keyboard, and the second key is displayed at the first location on the keyboard; and wherein the processor is further configured to:

obtain a keyword in information that is already input to an input box presented for the information input, and when a preset keyword set comprises the obtained keyword, determine that to-be-input information is the information of a first type.

9. The terminal device according to claim 8, wherein the processor is further configured to:

obtain an attribute information type of an input box that is currently presented for information input, and when the attribute information type of the input box is a first type, determine that the to-be-input information is the information of the first type.

10. The terminal device according to claim 8, wherein the processor is further configured to:

before the first arrangement of the keys on the keyboard is adjusted into the second arrangement of the keys, obtain a distance between the touching object and the touchscreen; and determine that the obtained distance is less than or equal to a first preset threshold.

11. The terminal device according to claim 10, wherein adjusting the first arrangement of the keys into the second arrangement of the keys, comprises:

randomly adjusting an arrangement order of the first key on the keyboard; or adjusting the first arrangement of the first key according to a movement track of the touching object on the keyboard.

12. The terminal device according to claim 8, wherein displaying the keyboard on the touchscreen according to the adjusted second arrangement of the keys comprises:

scaling up, according to a preset percentage, the first key and the second key, and displaying, in a preset manner, the first key and the second key that are scaled up; or controlling the touchscreen to display all keys on the keyboard, wherein all the keys comprise the first key and the second key and at least one key whose location on the keyboard is not adjusted.

13. The terminal device according to claim 12, wherein displaying, in the preset manner, the keys that are scaled up comprises:

displaying the adjusted arrangement of the keys in a rectangle, wherein the rectangle is divided into N parts, and each of the N parts of the rectangle corresponds to at least one of the adjusted keys; or displaying the adjusted arrangement of the keys in a circle, wherein the circle is divided into N parts, and each of the N parts of the circle corresponds to at least one of the adjusted keys; or displaying the adjusted arrangement of the keys in a loop, wherein the loop is divided into N parts, and each of the N parts of the loop corresponds to at least one of the adjusted keys; and wherein, N is equal to a quantity of the keys.

14. The terminal device according to claim 8, wherein the processor is further configured to:

after the keyboard is displayed on the touchscreen according to the second arrangement of the keys, when it is detected that a distance between the touching object and the touchscreen is greater than a second preset threshold, restore the first arrangement of the keys; or after the keyboard is displayed on the touchscreen according to the second arrangement of the keys, when it is detected that the location on the keyboard that the touching object points to is out of a preset range, restore the first arrangement of the keys.

* * * * *